United States Patent [19]
Maltby, Jr. et al.

[11] 3,788,750
[45] Jan. 29, 1974

[54] INSPECTING GLASS

[75] Inventors: Robert E. Maltby, Jr., Perrysburg;
Walter D. McComb, Oregon;
Richard D. Schave, Perrysburg, all
of Ohio

[73] Assignee: Libbey-Owens-Ford Company,
Toledo, Ohio

[22] Filed: Dec. 6, 1972

[21] Appl. No.: 312,785

[52] U.S. Cl. .................. 356/239, 356/201, 356/120, 356/125
[51] Int. Cl. ........................................... G01n 21/32
[58] Field of Search ... 356/239, 120, 124, 125, 126, 356/127, 237, 107; 350/266, 271, 272, 273, 274; 250/232, 233

[56] References Cited
UNITED STATES PATENTS
2,446,628   8/1948   Brown............................ 356/120 X

*Primary Examiner*—Ronald L. Wibert
*Assistant Examiner*—Matthew W. Koren
*Attorney, Agent, or Firm*—Elmer L. Collins et al.

[57] ABSTRACT

Inspection of flat glass or other transparent or reflecting material for vision distortion or optical quality by observing the lens power and width of positive and negative lenses on the surface or surfaces of the material. Two accurately spaced beams of light are directed toward the glass or other material being inspected, and the beams are then directed from the material to a chopper device. A photocell in the chopper device produces an electrical signal of two pulses separated in time by an amount proportional to the spacing between the beams as they arrive at the chopper. The spacing of the beams at the chopper changes in proportion to the reciprocal of the focal length of the lenses on the surface or surfaces of the sample, with a positive or convex lens causing the beams to converge and a negative or concave lens causing them to diverge upon leaving the sample. This causes a corresponding change in the time separation of the pulses from the photocell. The pulses are suitably electronically processed and the resulting signal is graphically recorded on a strip chart as an indication of position and focal length of lenses on the surface or surfaces of the material. Changes in the index of refraction within transparent material may also be detected.

27 Claims, 11 Drawing Figures

INSPECTING GLASS

BACKGROUND OF THE INVENTION

1. Field of the Invention

The invention pertains broadly to the evaluation of vision distortion or optical quality of transparent or reflecting material, and more particularly to an automatic inspection system for measuring the surface quality of flat glass by a uniform standard in terms of the lens power or focal lengths of lenses on the surface or surfaces of the glass.

2. Description of the Prior Art

Various methods have been employed over the years in the evaluation of flat glass distortion quality, including the use of devices such as the so-called grid boards, zebra-boards and shadowgraphs of various designs. The utility of such methods as an ultimate tool in determining functional distortion quality selection for sheet, plate or float glass is limited, however, in that generally more than one test is used and human judgment is involved in each procedure in determining whether a particular piece of glass falls within established quality limits. One factor which limits visual inspection systems is the resolution ability of the human eye. Sensitivity to different types of distortion also differs between systems. For example, light ream is readily apparent on a shadowgraph, is seen only with difficulty on a zebraboard, and is not seen at all on most grid board set-ups.

In order to permit establishment of uniform standards for the grading of glass into categories suitable for different end uses independent of visual inspection and its attendant human variation, a procedure for automatically inspecting flat glass has long been sought. To this end, a number of devices have been proposed for detecting some or all of the types of defects which may frequently occur in flat glass. One such device is illustrated in U.S. Pat. No. 3,533,706, issued Oct. 13, 1970 to R. E. Maltby, Jr. et al. Others are disclosed in U.S. Pat. No. 3,166,627 issued Jan. 19, 1965 to H. E. Shaw, Jr., and U.S. Pat. No. 3,202,043 issued Aug. 24, 1965 to W. F. Galey et al. Such devices have not proved entirely satisfactory for factory operation on a production basis in that they tend to be susceptible to vibration, air currents, and dirt on the glass, and consequently give erroneous readings. They may also require excessive maintenance by skilled technicians in order to operate properly.

SUMMARY OF THE INVENTION

In accordance with the present invention, there is provided a system for automated inspection of flat glass or other transparent or reflecting material for distortion quality wherein the lens power or the focal lengths of lenses or imperfections on the glass surfaces are measured. While it may be in any direction, the scanning generally proceeds across the direction of draw, that is, transversely of the direction in which the glass ribbon is originally formed. It has been observed that conditions in the flat glass which cause distortion generally occur as longitudinal streaks or thickness variations or non-planar areas on the glass surfaces. Scanned transverse to the direction of draw, these non-planar areas appear as lenses, with their width and lens power serving as a reliable index of the distortion quality of the glass. Thus utilized, the lenses serve as a basis for setting up standards for grading the glass independently of human judgment.

A helium neon laser is employed to generate an almost perfectly parallel bundle of light rays. This beam is split into two substantial parallel beams which are directed through or reflected from the glass sample to a chopper assembly. The chopper allows first one beam and then the other to impinge upon a photocell. The photocell consequently emits an electrical signal of two pulses separated in time by an amount proportional to the spacing of the beams as they arrive at the chopper. As they are scanned through the system, the spacing of the beams at the chopper changes in proportion to the reciprocal of the focal length of any lenses in the glass sample. Thus, a positive or convex lens area will cause the beams to converge, while a negative or concave lens will cause them to diverge upon leaving the glass. The spaced beams are focused upon the chopper by a concave mirror which causes them to be inverted, so that a convex lens on the glass actually causes the spacing between the beams to increase at the chopper while a concave lens causes the spacing to decrease. The pulses from the photocell are suitably amplified and differentiated, the pulse spacing is converted to an analog signal and filtered, and the resulting signal is fed into a strip recorder as the glass is scanned. The longitudinal axis of the strip chart represents the position along the sample, while the vertical axis represents the lens power of lenses on the glass. In general, the shorter the focal length of a lens, the more objectionable it is to a viewer. On the strip chart the amplitude is proportional to the lens power of lenses on the glass. Thus, the chart indicates the distortion quality in terms of lens power at any point along the glass sample.

It is therefore an object of the invention to provide an effective system for automatically measuring distortion quality of transparent or reflective material, and particularly of flat glass.

Another object of the invention is to provide a system which determines the distortion quality of such materials on the basis of a consistent reference standard.

Another object of the invention is to provide such a system which is durable, relatively easy to maintain, and not unduly influenced by external factors such as vibration, air currents, dirt on the glass and temperature variation often encountered in the areas where such devices are conveniently located.

Still another object is to provide a system for measuring distortion quality of flat glass which is independent of human evaluation so as to permit standardization of the grading.

Yet another object is to facilitate analysis of forming and/or fabricating processes for such materials by providing accurate data on the magnitude and type of optical imperfections or distortion characteristics.

Other objects and advantages of the invention will become more apparent during the course of the following description when read in connection with the accompanying drawings.

BRIEF DESCRIPTION OF THE DRAWINGS

In the drawings wherein like numerals are employed to designate like parts throughout the same.

DESCRIPTION OF THE PREFERRED EMBODIMENTS

Figure 1:
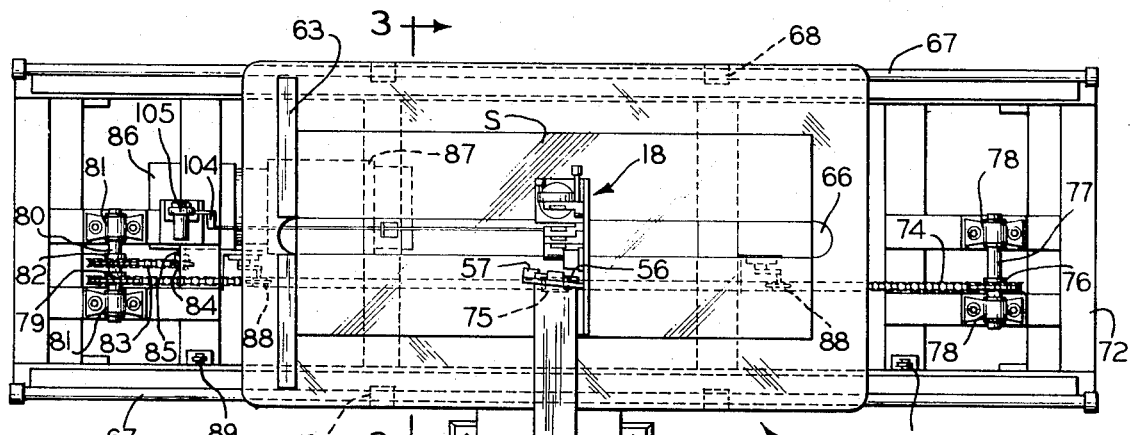
FIG. 1 is a broken plan view of a device for measuring distortion quality constructed in accordance with the invention.
Figure 1:
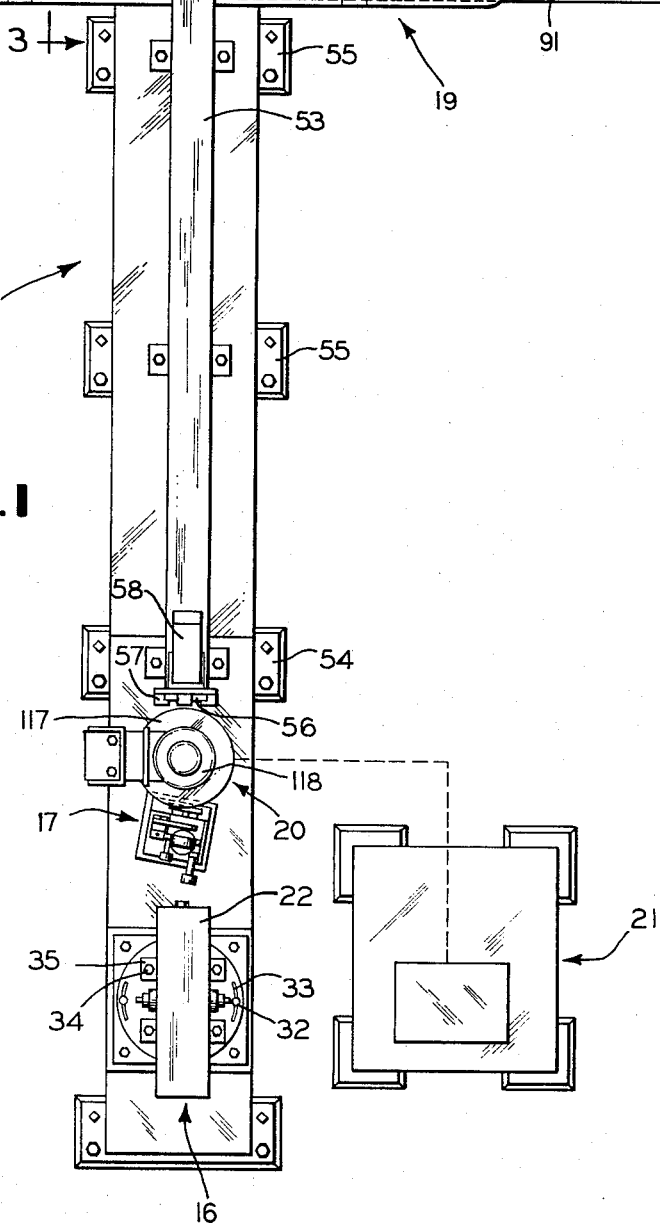
Figure 2:
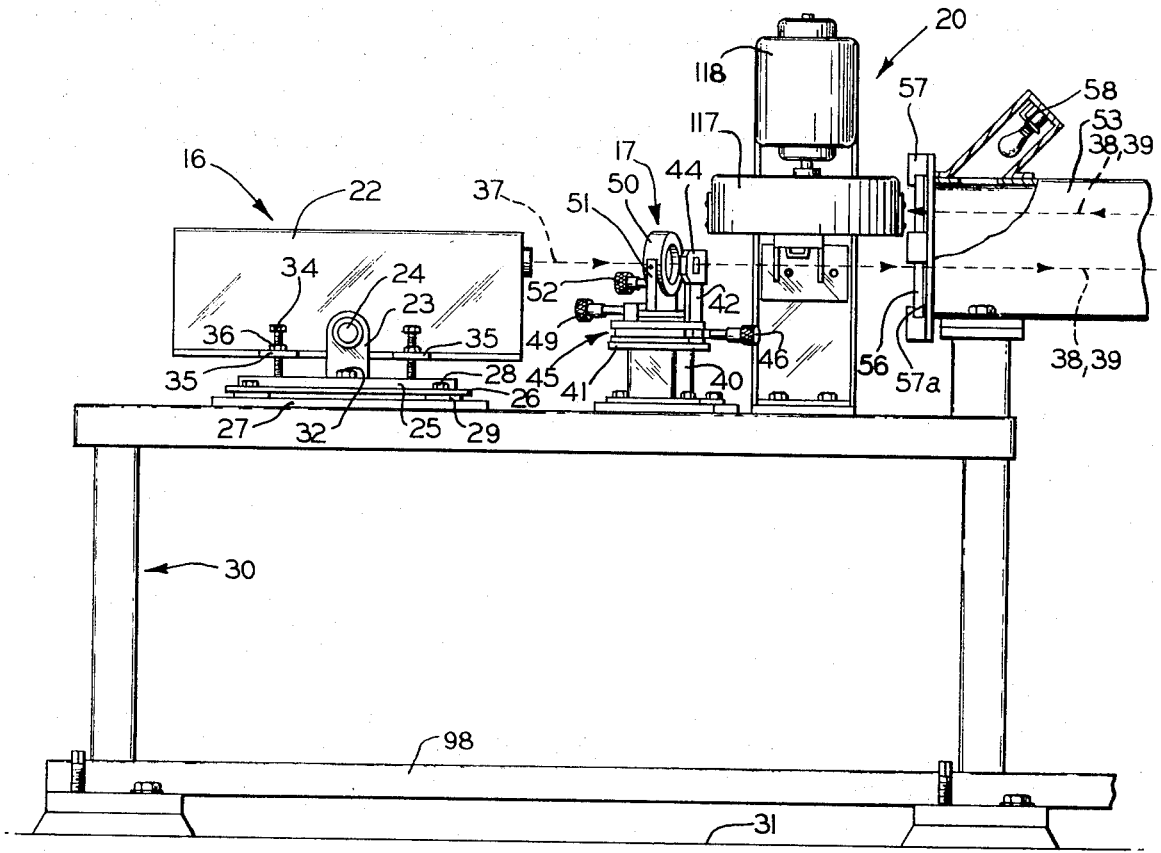
FIG. 2 is a side elevation view, partially in section, showing the light source and chopper assembly of the invention.
Figure 3:
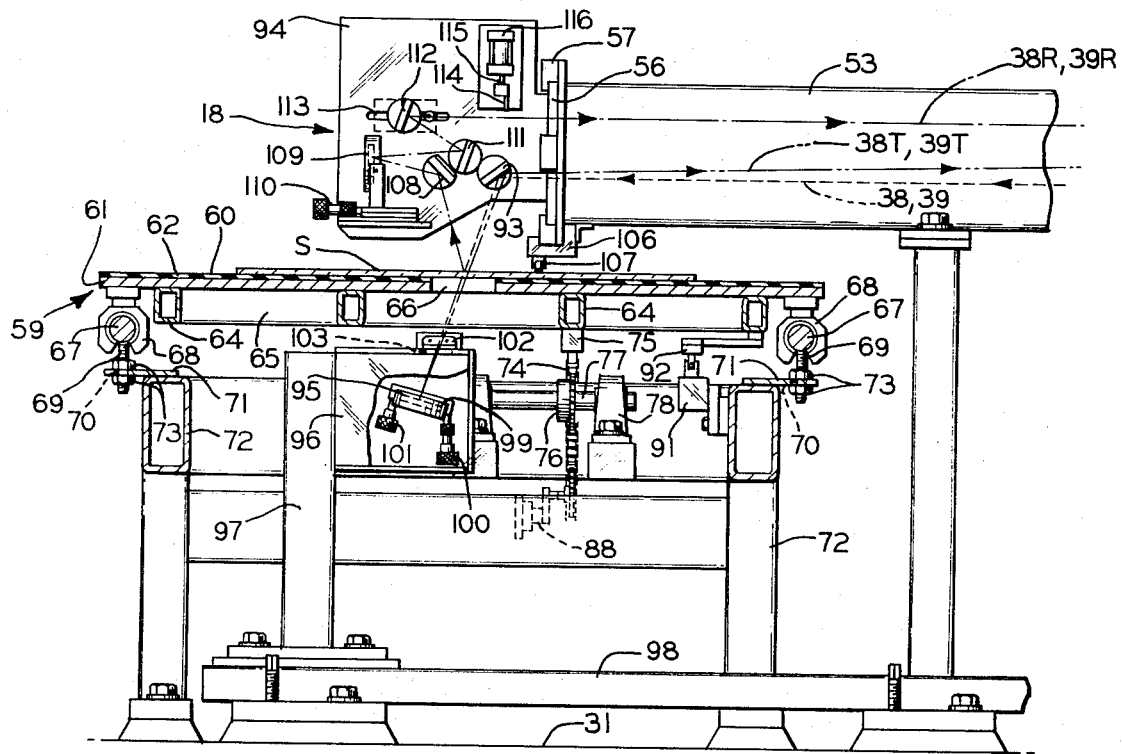
FIG. 3 is a side elevational view, taken substantially along line 3—3 of FIG. 1, showing the conveyor and reflecting system.

Referring now to the drawings, the inspection system or distortion meter of the invention is illustrated generally at 15 in FIG. 1. As best shown in FIGS. 1, 2 and 3, the system includes a laser light source 16, a beam splitter assembly 17, a mirror system 18, a carriage 19 carrying a glass sheet S to be examined, a chopper assembly 20, and a signal analyzing and recording device 21.

While other conventional light sources may successfully be employed, a low power laser has been found exceptionally well suited for use in the invention in that it provides an intense, highly collimated beam of light and is relatively low in cost and maintenance. The light source 16 comprises a laser unit 22 adjustably mounted so that the light beam therefrom can be properly oriented in the inspection system. To this end the laser unit 22 is pivotally mounted in bearing blocks 23 for swinging movement about a horizontal axis 24. The bearing blocks 23 are carried by a mounting plate 25 on a base plate 26 which, in turn, rests upon a support plate 27. The base plate is secured to the support plate as by bolts 28, and shims 29 may be placed between the base and support plates as needed to raise or lower the entire laser unit for adjusting purposes. The support plate is carried upon a framework 30 which rests upon the floor 31 to maintain the device at a height convenient for operating personnel. The mounting plate 25 is clamped to the base plate 26 by bolts 32 extending through arcuate slots 33 therein, whereby a limited swinging movement of the mounting plate and laser unit in the horizontal plane is provided. Adjusting bolts 34 threaded through tabs 35 on the laser unit 22 and bearing against the mounting plate 25 may be manipulated to swing the laser unit 22 about the horizontal axis 24 for purposes of adjustment. Lock nuts 36 on the adjusting bolts 34 maintain them in position when the properly adjusted position is attained.

Figure 5:
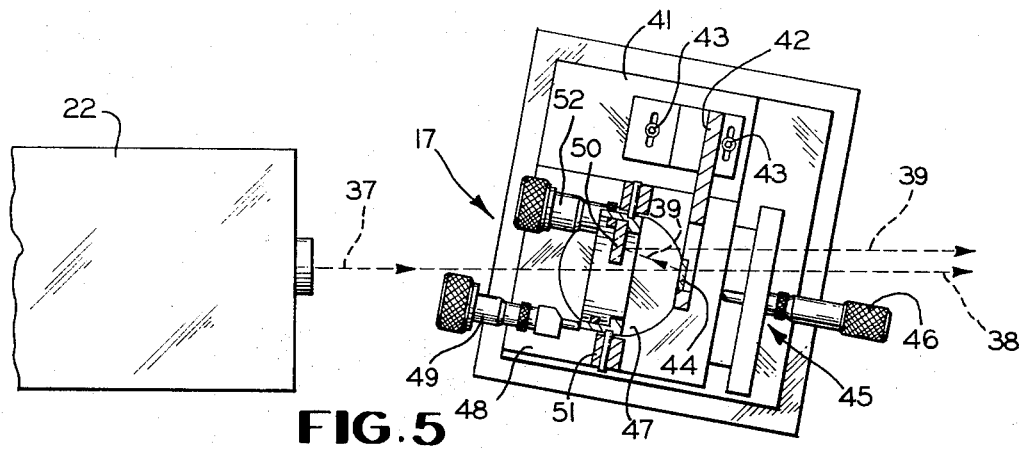
FIG. 5 is an enlarged plan view, partially in section, showing the beam splitter and its adjusting mechanism.

In order to provide the two beams of light employed by the system, the beam 37 from the laser unit passes through the beam splitter assembly 17 where it is split into right and left beams 38 and 39, respectively, of equal intensity (FIG. 5). As best shown in FIG. 5, the beam splitter assembly is of conventional construction and includes a pedestal 40 carried by the framework 30 and having a top plate 41 thereon. A bracket 42 adjustably secured to the top plate 41 by cap screws 43 carries the beam splitter 44 in the path of the beam 37.

Also mounted upon the top plate 41 is a translation stage device 45 having an adjusting thumbscrew mechanism 46 for causing translatory movement of the stage. An extension 47 projects upwardly from the stage, and a base plate 48 having a mating opening fits over the extension. By means of an adjusting mechanism 49, the base plate 48 may be rotated about the extension 47 on the translation stage of the device 45. A reflecting mirror 50 is pivotally mounted in a wye 51 carried by the base plate 48, and an adjusting mechanism 52 is provided for accurately swinging the mirror to selected positions within the wye.

As best shown in FIG. 5, as the beam 37 is split by the beam splitter 44, one portion continues on to become the right beam 38 and the other portion is reflected back and off the mirror 50 to become the left beam 39. For purposes of operation of the device, it is important that the beams 38 and 39 be substantially parallel, remain a known predetermined distance apart at the sample and be horizontally aligned. These conditions are maintained by manipulation of the adjusting devices 46, 49 and 52. Thus, the spacing between the beams at the beam splitter assembly is adjusted by means of the adjusting thumbscrew mechanism 46 which moves the stage and the reflecting mirror carried thereby toward or away from the beam splitter 44. The adjusting mechanism 49 rotates the mirror 50 about a vertical axis to set the beam spacing at the glass, while the adjusting mechanism 52 pivots it about a horizontal axis so that the beams can be made substantially parallel and horizontally aligned.

The focal lengths of the lenses which are to be measured on the sheet S are quite long, and it is necessary for the light source 16 and chopper assembly 20 to be some distance from the sheet in order that the deflection of the beams may be accurately resolved. For example, in one device constructed in accordance with the invention, the distance between the mirror system 18 and the beam splitter and chopper assembly was on the order of 12 ½ to 13 feet. With the invention, lens focal lengths up to about one mile can be measured. Lens power in diopters is defined as one over the focal length in meters, and with the above-described device, a lens power at the glass of about 0.5 millidiopters can be resolved.

Slight influence upon the light beams by external factors can adversely affect the readings due to the distance the beams travel, and thus an enclosed tunnel 53 is provided through which both the incident and return beams travel as will be more fully described. The tunnel is suitably supported at the light source end upon a pier 54 and throughout the rest of its length by spaced pedestals 55 (FIG. 1), all of which comprise part of the framework 30 upon which the system is mounted. The ends of the tunnel are closed by transparent covers 56, suitably coated to minimize reflection, and held in place by clamps 57. At the light source end of the tunnel a light colored opaque target plate 57a having two small rectangular target openings, one above the other, overlies the transparent cover. The outgoing light beams pass through the lower of the openings while the return beams pass through the upper opening. A lamp 58 is provided for illuminating the light colored target plate so that in aligning the optical system, an observer can look through the tunnel from the opposite end to center the red dots of the laser light beams upon the dark target openings in the lighted opaque plate. The centered beams will thus properly strike the chopper wheel.

The inspection device of the invention is capable of measuring both the transmitted or two surface distortion and the reflected or one surface distortion of the glass sheet S. Thus, for some end uses it is important to know the distortion characteristics of one surface of the glass, while for other uses it is important to know the distortion characteristics for transmitted light. For example, in glass to be employed in producing front surface mirrors, the distortion quality of this one surface is the controlling factor and the device would be operated in the reflected mode. Likewise, in glass to be laminated for automotive vehicles, potential distortion due to irregularlity of the inner surfaces is effectively eliminated by the laminating so that the one surface or reflection distortion of the outer surface of the sheet may be the controlling factor. Glass having the rear surface coated to form a rear surface mirror may also be inspected by operating the device in the reflected mode. In determining acceptable quality of glass for installation as a glazing unit and through which objects will be viewed, such as architectural glass or automotive glass, for example, transmitted distortion quality will be the limiting factor and for inspection thereof the device is operated in the transmitted mode. Fabricated automotive glass such as curved side lite and back lite units and laminated windshields can also be inspected for distortion quality in this manner by adapting the carriage 19 to accommodate the curved units. Another area in which the invention has proved invaluable is in the inspection of the plastic interlayer material to be used in producing laminated glass. Samples of the interlayer material are removed from the shipment as received from the manufacturer and laminated between glass sheets of high optical quality. The laminated samples are then graded upon the device for transmission distortion. Since the glass sheets of the laminate are known to be relatively distortion free, the distortion reading is indicative of the quality of the material as an interlayer in laminating glass.

The carriage 19 comprises a table 59 having a flat upper surface 60 for supporting the sheet S. The surface 60 should be extremely flat so as to avoid apparent distortion of the sheet due to uneven support, and should hold the sheet against slipping relative thereto. To this end it has been found that the table may advantageously comprise a mettallic plate 61 to which is bonded as by vulcanizing a neoprene layer 62. The neoprene layer is then machined to provide the flat surface 60, and the surface has a sufficiently high friction coefficient to hold the sheet S firmly in place when it is deposited thereon. Locating strips 63 are affixed to the table to assist in orienting the sheet thereon and to insure that the leading edge will be consistently located for initiating operation of the system. Longitudinal and transverse braces 64 and 65, respectively, affixed to the lower surface of the plate 61 strengthen the carriage and prevent deflection of the surface 60. An elongated opening 66 extends longitudinally of the carriage so that the light beams 38 and 39 can pass therethrough in the transmitted mode of the invention as will be hereinafter explained.

The carriage 19 moves back and forth in a reciprocating motion to carry the sheet past the light beams and mirror system 18 on a pair of longitudinally extending cylindrical rails 67 receives within mating carriage blocks 68 affixed to the underside of the table 59. In order that the rails 67 can be vertically aligned, they are supported upon threaded leveling bolts 69 spaced throughout their length. The leveling bolts extend through openings 70 in extension plates 71 carried by a structural framework 72 upon which the entire carriage assembly is supported, and adjusting nuts 73 are threaded on the leveling bolts on either side of the extension plates. By manipulating the nuts 73, the cylindrical rails 67 can be aligned to provide a planar path for the table and sheet thereon.

The normal at-rest position of the carriage 19 is at the extreme right end of the framework 72 and rails 67 as viewed in FIG. 1. The sheet S is placed on the surface 60 in this position and then the carriage is activated to move slowly along the rails to the opposite or left end and then return to the at-rest position. In order to provide this reciprocating motion, an endless roller chain 74 is attached by means of a clamp 75 to the bottom of one of the longitudinal braces 64. At one end the roller chain extends around a sprocket 76 on a shaft 77 journaled in pillow blocks 78 mounted on the structural framework 72. At the other end the chain extends around a main sprocket 79 on a line shaft 80 journaled in pillow blocks 81 affixed to the structural framework. Also on the drive shaft 80 is a line sprocket 82 carrying a drive chain 83 extending around a drive sprocket 84 on the outlet shaft 85 of a gear reduction and braking unit 86. The gear reduction unit is driven by a suitable reversible electric motor 87. The lower flight of the chain 74 is carried upon a series of idler sprockets 88 suitably affixed to the framework 72 so that they can be adjusted to regulate the tension in the chain. A reversing switch 89 mounted on the structural framework 72 is engaged by an actuating arm 90 affixed to the carriage 19 when it reaches the extremity of its outward movement to reverse the motor 87 and return the carriage to its starting point. A cut-off switch 91 on the framework at the opposite end has an actuating arm 92 which is engaged by the carriage as it returns to deactivate the motor and stop the carriage in its at-rest position.

In order to provide consistency between the readings and permit use of a single chopper assembly, it is desirable that the optical paths from the glass sheet S to the chopper assembly 20 be substantially equal in length in the reflected and transmitted modes. To this end, as the light beams 38 and 39 emerge from the tunnel 53 they are deflected downwardly to impinge upon the glass sheet S by a first flat mirror 93 affixed in any suitable manner to a mounting fixture 94 carried at the end of the tunnel 53. The mirror 93 is rotatably mounted so that it can be adjusted to properly align the optical system.

With the device operating in the transmitted mode the beams 38 and 39, after being deflected by the mirror 93, continue through the glass sheet S to impinge upon a concave mirror 95 therebeneath, which serves to focus the beams upon the chopper wheel as will be hereinafter more fully described. The mirror 95 is mounted within a box 96 in order to protect it from dust and dirt which may be present in the area. The box is carried by a pedestal 97 resting on the floor 31 and tied to the framework 30 of the light source and tunnel by struts 98 so that the various elements remain fixed relative to one another. The mirror is supported within the box by a conventional mirror mount 99 having positioning screws 100 and 101 for adjusting the mirror about its major axes. A shutter 102 closes an opening 103 in the top of the box except for the times when it is necessary for the light beams from the glass to impinge upon the mirror. The shutter is operated by a rod 104 connected to the armature of a solenoid 105. The solenoid is preferably located some distance from the shutter so that heat generated during its operation does not create a rising current of warm air moving upwardly past the mirrors to cause distortion of the light beams. Alternatively, an air cylinder (not shown) may be employed to operate the shutter. Since such an air cylinder does not generate heat in its operation, it may be located immediately adjacent the shutter.

The shutter 102 normally remains closed. With the device set to operate in the transmitted mode, the shutter is controlled by a switch 106 above the sheet S and beneath the tunnel 53. The switch has an arm 107 which rides up over the locating strip 63 and the sheet as it moves into position for inspection, thereby energizing the solenoid 105 and opening the shutter 102 whenever there is a sheet in position for inspection.

Operation of the device in the reflected and mirrored modes is basically the same. In the reflected mode only the beams reflected from the top surface are utilized as will be hereinafter more fully explained, while in the mirrored mode only the beams reflected from the lower mirrored surface are utilized. The intensity of the return beams in the transmitted and mirrored modes is on the order of 25 times as great as in the reflected mode. A pre-amplifier is employed in the electronic system to bring the signal level in the reflected mode up to that of the transmitted and mirrored modes of operation for further processing. Due to this great difference in intensity, when the device is operated in the mirrored mode and the signal from the photocell is not pre-amplified, the signal created by the beams reflected from the top surface is insignificant and can be ignored.

Thus, in order to measure the quality of the top surface only or of a mirrored lower surface of the glass sheet S, the device is switched from the transmitted mode to the reflected or mirrored mode of operation, respectively, as by a switch (not shown). As will be hereinafter explained, the portion of the light beams 38 and 39 reflected from the top surface of the sheet or from the lower mirrored surface, as the case may be, are then directed back through the chopper assembly 20 and signal analyzing and recording device 21 to give an indication of the quality of the surface being checked. To this end, the incident light beams 38 and 39 deflected toward the sheet S by the first flat mirror 93 are reflected from the surface under inspection to be intercepted by a second flat mirror 108 (FIG. 3). From the mirror 108 the beams are directed to a concave mirror 109 carried by the mounting fixture 94. The concave mirror 109 has conventional two directional adjusting means 110 and serves to focus the apparent beam spacing at the beam splitter assembly onto the chopper wheel. The beams are reflected from the concave mirror 109 to a third flat mirror 111 and finally to a fourth flat mirror 112 which directs them along the tunnel 53 to the chopper assembly 20. The flat mirrors 111 and 112 are mounted upon the mounting fixture so as to be pivotable to permit proper alignment of the return beams. In addition, the mirror 112 is mounted so as to be slidable along a slot 113 in the mounting fixture 94 to permit adjustment in the length of the optical path of the reflected beams. It is thus possible to make the length of the optical path from the glass sheet S to the chopper assembly 20 substantially equal in the transmitted, mirrored and reflected modes so that a single chopper assembly will suffice for the three modes of operation. This also allows the transmitted mode zero to be the reference for the reflected and mirrored modes of operation.

Of course, the portions of the beams reflected from the top and bottom surfaces of the sheet S are also reflected when the device is operating in the transmitted mode. Although these beams are generally insignificant and can be ignored as pointed out above, they can be easily prevented from reaching the chopper assembly and to this end a blocking target 114 carried by the piston 115 of an air cylinder 116 on the mounting fixture 94 is interposed in their path. When the device is operated in the reflected or mirrored mode, the air cylinder retracts its piston and withdraws the blocking target from the path of the reflected beams 38 and 39. In the transmitted mode the target 114 blocks the beams from entering the tunnel 53.

Figure 4:
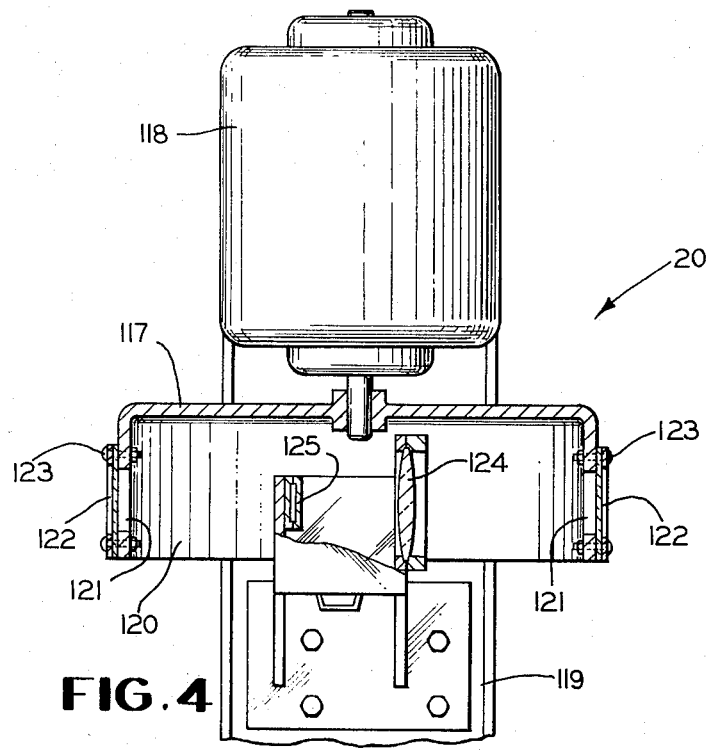
FIG. 4 is an enlarged fragmentary view, partially in section, showing the chopper assembly of the invention.

The reflected beams from either the flat mirror 93 in the transmitted mode or the flat mirror 112 in the reflected and mirrored modes, travel back through the tunnel 53 and the covers 56 at the ends thereof to impinge upon the chopper assembly 20. As best seen in FIGS. 2 and 4, the chopper assembly itself is of more or less standard construction and includes a drum 117 on the shaft of and driven at a constant velocity by a motor 118. The motor is mounted on a bracket 119 carried by the framework so that the drum lies in the path of the reflected beams 38 and 39. The drum 117 has a dircumferential flange 120 in which there is provided a pair of slits 121 spaced 180° apart on the drum. A smaller drum having a single slit may be employed, but it is preferred that it have a relatively large diameter, on the order of 8 inches, to reduce the peripheral curvature so that the spaced light beams will be more nearly normal to the drum surface at the points where they impinge thereon. Two slits spaced 180° apart are employed rather than a single slit in order to reduce the necessary angular velocity of the drum. Covers 122 are affixed over the slits as by bolts 123.

As the drum 117 rotates at a constant velocity, it chops or interrupts the light beams 38 and 39 at a time interval proportional to the spacing between the beams. A lens 124 mounted within the drum 117 focuses the sequentially chopped beams upon a photocell 125 therein. The photocell thus produces a pair of electrical pulses spaced in time in proportion to the distance between the light beams for each half rotation of the drum 117. As will be hereinafter explained, the pulses are transmitted to the signal analyzing and recording mechanism 21 for translation into data indicative of the position and focal length of lenses on the surface or surfaces of the glass sheet S.

Figure 7:
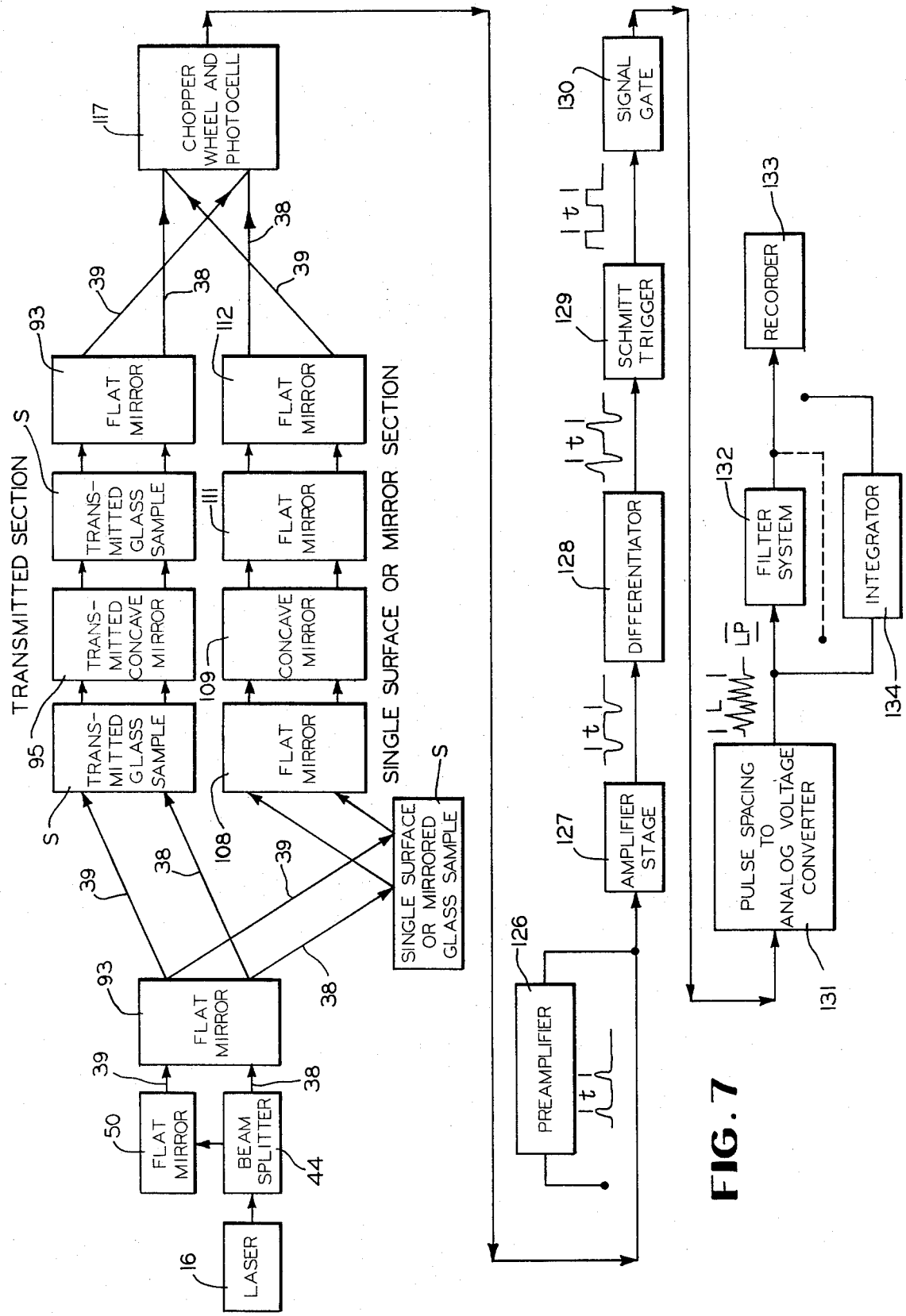
FIG. 7 is a block diagram illustrating the relationship between the components of the optical and electronic systems of the invention.
Figure 8:
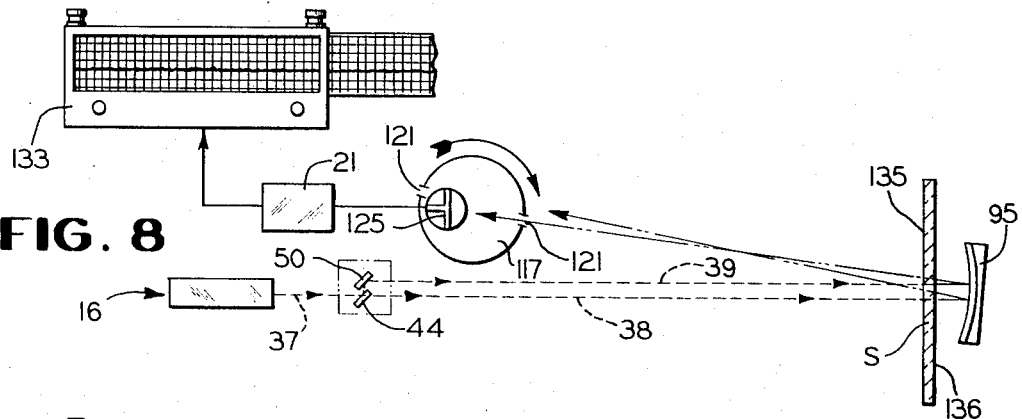
FIG. 8 is a schematic diagram illustrating the data recorded on the strip chart when evaluating a sheet of glass with planar surfaces in the transmitted mode of the invention.

To illustrate the operation of the device, the optical and electronic phases of the invention are shown schematically in the block diagram of FIG. 7. Thus, a well collimated light beam with a Gaussian energy distribution is directed from the laser source 16 to the beam splitter 44 which splits the beam into the right and left beams 38 and 39, respectively. The left beam 39 is reflected by the flat mirror 50 so as to be substantially parallel to and spaced from the right beam 38. The spaced beams are then reflected by the first flat mirror 93 to the glass sheet S on the table 59. If the device is operating in the transmitted mode for measuring distortion through the glass sheet, the beams pass through the glass where they are deflected should a lens be present. The beams are then reflected back through the sample by the concave mirror 95 to the first flat mirror 93. The concave mirror focuses the apparent beam spacing at the beam splitter assembly onto the chopper wheel. Of course, in going back through the sample, the beams are again deflected by the lens. The flat mirror 93 directs the spaced beams onto the chopper wheel 117 and photocell 125 therewithin.

If the device is operating in the single surface or mirrored modes, the light beams 38 and 39 are reflected from the glass sample S to the second flat mirror 108 and then to the concave mirror 109 by which they are focused onto the chopper wheel. The beams are then directed by the third and fourth flat mirrors 111 and 112, respectively, to the chopper wheel 117.

For each half revolution of the chopper wheel 117 the photocell 125 therewithin provides two electrical pulses whose time spacing (t) is proportional to the beam spacing at the surface of the chopper wheel. These pulses are fed into the electronic signal analyzing and recording device 21 (FIG. 1). The basic function of the electronic unit is to amplify the low level signal from the photocell to an amplitude at which the time between pulse peaks can be transformed to an analog voltage which can be filtered and integrated over the length of the glass sheet S and displayed on a strip recorder.

Since only a small percentage of the incident light is reflected by the glass surface, the output signal of the photocell is, of course, much weaker in the reflected mode than for the transmitted and mirrored modes of operation as hereinbefore described. In order to bring the intensity of this signal up to the level in the other modes and provide sufficient output signal in each mode, a pre-amplifier 126 is switched into the circuit before the amplifier stage in the reflected mode. Thereafter the signal, in all modes of operation, goes through an amplifier 127 for amplification to a suitable magnitude and is then fed into a differentiator 128. The signal is differentiated in order to accurately pinpoint the input pulse peaks. Since the slope of the input pulse is zero at the peak, there is a corresponding zero crossover point on the differentiator output. The signal next is fed to a Schmitt trigger 129 which turns on at a slightly positive value input and shuts off at zero. As a result, the output is a set of square pulses $P_1$ and $P_2$ (FIG. 7). The time between the ends of the pulses $P_1$ and $P_2$ is equal to the time between the peaks of the photocell output pulses.

The pulses $P_1$ and $P_2$ are fed into a signal gate 130 which allows the two pulses to pass into a converter 131, and then closes and rejects any signal until the next set of pulses is due to arrive at the gate input. Thus, random noise which may occur between sets of pulses is not allowed into the converter 131 which receives the signal from the gate 130. The converter transforms the time between the ends of the pulses $P_1$ and $P_2$ to an analog voltage which then passes to a filter system 132 having four manually selectable modes of operation, namely, no filter, low pass, high pass, and a combination of low pass and high pass providing a band pass filter. In the longitudinal direction the signal from the converter 131 represents the location L (FIG. 7) along the sheet S while the transverse direction represents the lens power LP at that particular location.

The apparent lens in the glass may be either a lens on the surface or a curvature in the sheet itself giving it a corrugated effect. Certain of these defects are more significant in glass to be used for some purposes than for others. For example, in mirror glass wide streaks or corrugations are most objectionable while in automotive windshield glass, narrow streaks or corrugations are more objectionable. The various filters are employed to eliminate from the signal those defects which would not make the glass undesirable for a particular purpose.

The output from the filter system is relayed through a selective switch (not shown) to a strip recorder 133 whereby the data are recorded. The analog voltage is also fed into an integrator 134 which gives an over-all grade for the sheet S according to predetermined standards, with the grade being read out through a switch into the recorder 133.

There is illustrated schematically in FIGS. 8 through 11 the manner in which the device operates to detect and record defects in the various modes. Thus, in FIG. 8 the device is operating in the transmitted mode and the beam 37 from the laser light source 16 is split by the beam splitter 44 so as to, by means of the reflecting mirror 50, provide the right and left beams 38 and 39. The beams are transmitted through the glass sheet S having planar front and rear surfaces 135 and 136 so that they are not deflected relative to one another. They are then reflected and focused onto the chopper wheel 117 by the concave mirror 95 so that they successively pass through the slit 121 to impinge upon the photocell 125. The resulting pulses, spaced in time in proportion to the beam spacing at the surface of the chopper wheel, are processed through the signal analyzing device 21 and, since the beams have not been deflected, the signal will be recorded as a straight line along the center line of the chart of the strip recorder 133.

Figure 9:
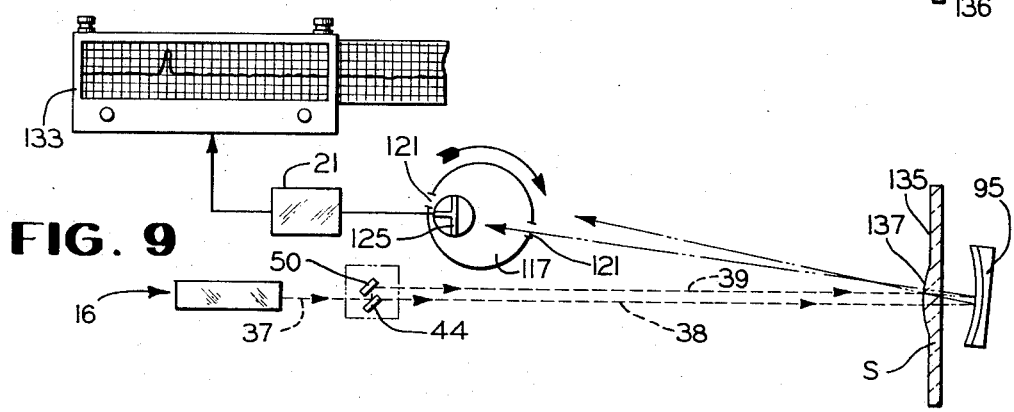
FIG. 9 is a schematic diagram similar to that of FIG. 8 and illustrating the manner in which a positive lens on the surface is represented by a peak above the center line of the chart, with the amplitude of the peak indicating the lens power of the lens.
Figure 10:
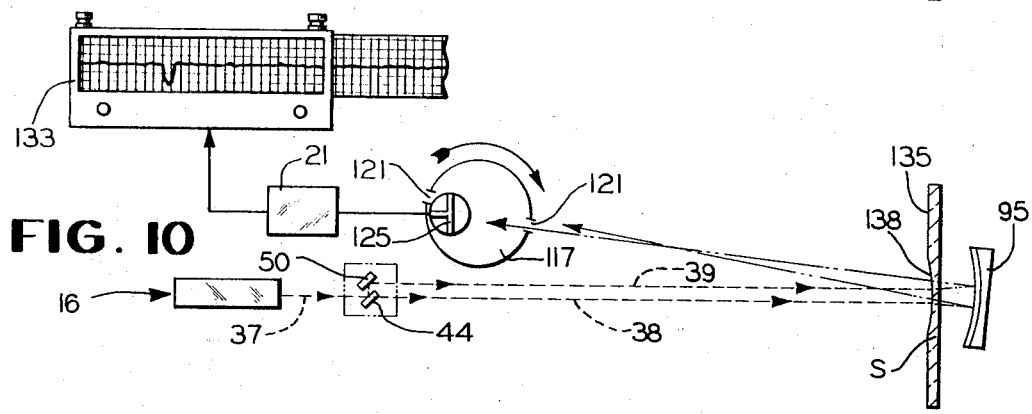
FIG. 10 is a schematic diagram similar to that of FIGS. 8 and 9 but illustrating the manner in which a negative lens area on the glass surface is represented by a peak below the center line of the chart.

In FIG. 9 the glass sheet S has, in exaggerated form, a positive or convex lens 137 on its front surface 135. This causes the light beams 38 and 39 to converge as they pass through the sheet. The mirror 95, in focusing the beams upon the chopper wheel, causes them to be inverted so that the spacing therebetween is increased at the slits 121 of the chopper wheel. The resulting increased spacing between pulses from the photocell, after processing through the electronic analyzing unit 21, causes the signal to be recorded as a peak above the center line on the chart of the strip recorder. Conversely, in FIG. 10, the glass sheet has a concave or negative lens 138 on its surface which unequally deflects the beams 38 and 39, causing them to diverge. The beam spacing at the slits 121, after the beams are inverted by the mirror 95, is thus decreased and the signal is recorded as a peak below the center line on the recorder chart. An experienced observer can detect from a glance at the strip chart the number, type, severity and location of defects in the sheet. Of course, the irregularities might also be on the rear surface 136 of the sheet or might be a combination of front and rear surface conditions. In these situations it can be determined whether the defects are lenses or corrugations by inspecting both surfaces in the reflected mode and then placing in registry the top and bottom surface scans. If the two traces then superimpose, the glass is corrugated. If not, it contains lenses, i.e., thickness variations.

Figure 11:
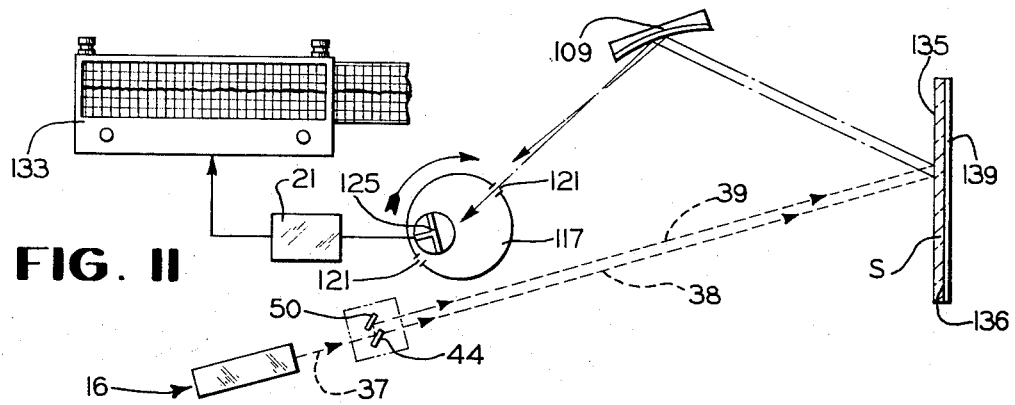
FIG. 11 is a schematic diagram illustrating the paths of the light beams when the invention is operated in the reflected or mirrored mode.

The reflected mode of operation is illustrated in FIG. 11. In this mode, the portion of the beams 38 and 39 reflected from the front surface 135 of the sheet is focused upon the chopper wheel 117 by the concave mirror 109. In order to prevent stray light beams reflected by the rear surface 136 from interfering during measurement of single surface distortion of a plain glass sheet, a coating 139 of a light diffusing material such as ordinary petroleum jelly is applied to the rear surface 136. This layer prevents the light beams from passing beyond the sheet and scatters the light which is transmitted to the rear surface so that it does not reflect and reach the photocell to give erroneous readings. In grading a rear surface mirrored sample, on the other hand, the rear surface 136 has a reflective mirror coating (not shown) in place of the light diffusing layer, and the beams reflected from the mirror coating are measured at the chopper.

Figure 6:
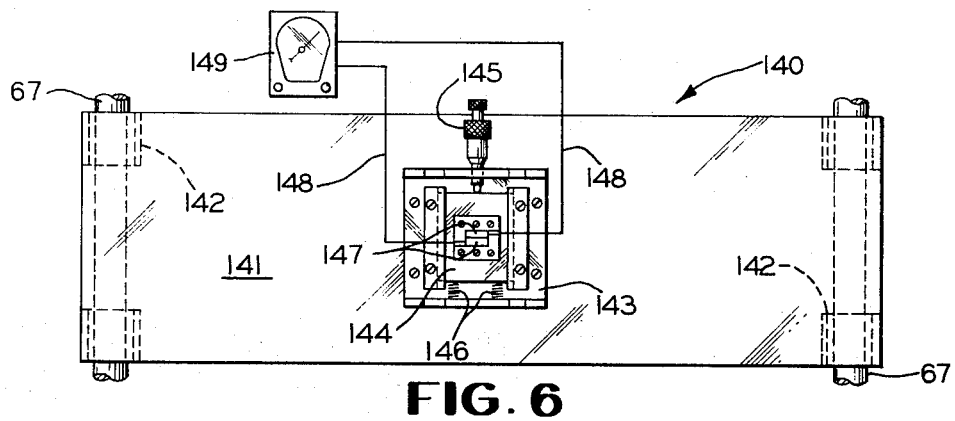
FIG. 6 is a fragmentary plan view of the beam spacing calibrator on the conveyor rails.

In order for the distortion data produced by the device to be consistent and accurate, it is essential that the spacing between the beams 38 and 39 as they strike the sheet S be known and remain constant. Any suitable beam spacing may be employed, but it must remain constant in order to permit standardization of results. For example, a spacing of 0.250 inch has been found particularly suitable. To this end, there is provided a beam spacing calibrator 140 (FIG. 6) by means of which the beam spacing can be periodically checked and adjusted if necessary. The calibrator includes a platform 141 having carriage blocks 142 on its lower surface which are adapted to ride upon the cylindrical rails 67. When it is desired to check the spacing of the incident beams 38 and 39, the table 59 is run to the end of the cylindrical rails 67 so that is is displaced from beneath the mirror system 18. The beam spacing calibrator is then placed upon the rails and moved into position beneath the mirror system 18.

At its center the platform 141 has a guide assembly 143 within which a stage 144 is mounted for linear sliding movement. A micrometer 145 at one end of the stage moves it along the guide assembly, and a pair of springs 146 urge the stage against the micrometer. A pair of photocells 147 producing equal signals is mounted on the stage at the position which is occupied by a glass sheet S on the table 59. The photocells are connected by leads 148 to a conventional meter 149 in such a manner that when they are equally activated by a light beam, they cancel each other out and the meter reading will be zero.

In checking the beam spacing the micrometer 145 is set at zero. One of the beams, for example the left beam 39, is blocked and the platform 141 is moved along the rails 67 until the right beam 38 is visually centered on the photocells and the meter reads zero. The micrometer 145 is then set to read 0.250 inch, or whatever the desired beam spacing may be, without moving the platform 141 on the rails. The beam 39 is then unblocked and the beam 38 is blocked. If the beams are properly spaced, the meter will read zero. If the meter does not read zero, the adjusting mechanism 49 on the beam splitter is manipulated until it does so. The beam 38 is then unblocked and the beam spacing calibrator 140 is removed from the rails to ready the distortion meter for operation.

While the invention is particularly adapted to, and has been described herein in connection with the inspection of monolithic flat glass sheets, it will be understood that in its broader aspects it is applicable to the inspection and grading of any transparent or reflective material wherein the presence of varying indices of refraction or the degree of surface flatness may be of importance. Thus, its use in inspecting curved glass sheets, laminated glass, various forms of plastic, and polished metal surfaces, is contemplated. For example, the suitability of plastic interlayer material for laminating may be checked by laminating a sample of the material between glass sheets of known optical properties and then inspecting the laminated unit. Any defects not accounted for in the individual glass sheets are thus attributable to the plastic interlayer.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In a method of determining the optical quality of a sheet of transparent or reflective material whose surfaces are generally smooth and planar in the area under observation and whose imperfections include lenses of relatively long focal length, the improvement comprising the steps of directing a pair of spaced, substantially parallel beams of light against said sheet with a predetermined spacing therebetween, directing said beams from said sheet to a remote point and periodically sequentially chopping said beams at a constant rate at said remote point, photoelectrically intercepting said chopped beams and producing a signal therefrom comprising pulses spaced in time in proportion to the spacing between said beams as they are chopped, comparing the spacing between said chopped beams as represented by said pulses with a corresponding signal representing said predetermined spacing, and translating the change in said spacing into an indicia of the magnitude and type of optical imperfection of said area under observation.

2. A method of determining the optical quality of a sheet of transparent or reflective material as claimed in claim 1, including moving said sheet along a predetermined path past said beams of light to thereby ascertain the degree of optical imperfection in a band across said sheet.

3. A method of determining the optical quality of a sheet of transparent or reflective material as claimed in claim 1, wherein a portion of said beams are reflected from the first surface of said sheet to said remote point to detect imperfections at said first surface.

4. A method of determining the optical quality of a sheet of transparent or reflective material as claimed in claim 3, wherein said sheet is transparent, including diffusing the portion of said beams transmitted through said sheet at the second surface to prevent any portion of said beams from being reflected therefrom to said remote point.

5. A method of determining the optical quality of a sheet of transparent or reflective material as claimed in claim 1, wherein said sheet is transparent and including transmitting said beams through said sheet and then reflecting them back through said sheet to said remote point.

6. A method of determining the optical quality of a sheet of transparent or reflective material as claimed in claim 5, including the step of blocking any reflections of said beams from the first surface of said sheet to said remote point.

7. A method of determining the optical quality of a sheet of transparent or reflective material as claimed in claim 1, wherein said sheet has a reflective coating on its second surface and said beams are reflected by said coating to said light sensitive element.

8. A method of determining the optical quality of a sheet of transparent or reflective material as claimed in claim 2, including the step of recording said indicia on a chart as said sheet moves past said beams of light to provide a record of said defects in said band across said sheet.

9. In apparatus for determining the optical quality of a sheet of transparent or reflective material whose surfaces are generally smooth and planar and whose imperfections include lenses of relatively long focal length in the area under observation, the improvement comprising means for supporting said sheet in position for inspection, a light source directing a pair of spaced substantially parallel incident beams of light against said sheet with a predetermined spacing, chopping means intercepting the beams of light projected from said sheet and sequentially chopping said beams at a constant rate, light-sensitive means in the path of said chopped beams intercepting said beams and producing signals separated in time in proportion to the spacing between said beams at said chopping means, and processing means for receiving said signals and comparing said beam spacing at said chopping means with said predetermined spacing and thereby indicating the type and magnitude of optical imperfection of said area.

10. Apparatus for determining the optical quality of a sheet of transparent or reflective material as claimed in claim 9, wherein said means for supporting said sheet in position for inspection includes a carriage upon which said sheet rests, and means for moving said carriage to move said sheet thereon past said spaced beams of light to thereby scan a strip across said sheet.

11. Apparatus for determining the optical quality of a sheet of transparent or reflective material as claimed in claim 9, wherein said means directing said beams of light against said sheet includes a source producing a collimated light beam, and a beam splitter and mirror dividing said collimated beam into said substantially parallel beams of light.

12. Apparatus for determining the optical quality of a sheet of transparent or reflective material as claimed in claim 11, wherein said source producing said collimated beam is a low power laser.

13. Apparatus for determining the optical quality of a sheet of transparent or reflective material as claimed in claim 9, including a concave mirror positioned on the same side of said sheet as said means directing said beams of light against said sheet for intercepting the portion of said beams reflected from the front surface and a mirrored rear surface of said sheet and focusing said portion on said chopping means.

14. Apparatus for determining the optical quality of a sheet of transparent or reflective material as claimed in claim 9, including a concave mirror positioned on the side of said sheet opposite said means directing said beams of light against said sheet for intercepting said beams transmitted through said sheet and focusing them on said chopping means.

15. Apparatus for determining the optical quality of a sheet of transparent or reflective material as claimed in claim 9, wherein said chopping means includes a drum mounted for rotation about its longitudinal axis and an opening in the wall of said drum through which said beams of light pass, and said light-sensitive means is mounted within said drum so as to intercept said beams of light passing through said opening.

16. Apparatus for determining the optical quality of a sheet of transparent or reflective material as claimed in claim 9, including means for recording said processed signal on a chart.

17. Apparatus for determining the optical quality of a sheet of transparent or reflective material as claimed in claim 9, in which said signal processing means includes an amplifier, a differentiator, a Schmitt trigger, a signal gate, a digital-to-analog converter, a filter, and means for recording the processed signal.

18. Apparatus for determining the optical quality of a sheet of transparent or reflective material as claimed in claim 10, including a strip recorder for receiving and recording the processed signal whereby the amplitude of the recorded signal represents type and magnitude of said imperfections and the longitudinal axis thereof represents position along said strip across said sheet.

19. Apparatus for determining the optical quality of a sheet of transparent or reflective material as claimed in claim 9, wherein said means for supporting said sheet in position for inspection includes a carriage with a sheet supporting surface whose configuration is complementary to that of said sheet upon which said sheet rests in substantially horizontal position, a longitudinally extending opening in said sheet supporting surface, said light beams being projected downwardly against said sheet in alignment with said opening, means for moving said carriage and said sheet thereon past said spaced beams of light to scan a strip across said sheet, an upper concave mirror positioned above said sheet for intercepting portions of said beams of light reflected from the upper surface of said sheet and a reflective coating on the rear surface thereof and focusing said reflected portions on said chopping means, and a lower concave mirror positioned beneath said sheet for intercepting said light beams transmitted through said sheet and said opening in said supporting surface and focusing them upon said chopping means.

20. Apparatus for determining the optical quality of a sheet of transparent or reflective material as claimed in claim 19, including first blocking means operative to prevent said portions of said light beams focused by said upper concave mirror from reaching said chopping means while said beams transmitted through said sheet are being focused upon said chopping means by said lower concave mirror.

21. Apparatus for determining the optical quality of a sheet of transparent or reflective material as claimed in claim 19, including second blocking means operative to prevent said beams from said lower concave mirror from reaching said chopping means while said portions of said beams from said upper concave mirror are being focused upon said chopping means.

22. Apparatus for determining the optical quality of a sheet of transparent or reflective material as claimed in claim 19, wherein said incident light beams are projected in a generally horizontal direction from said light source, and including a first mirror mounted above said sheet for deflecting said incident beams downwardly against said sheet and for directing the reflected beams from said lower concave mirror along a generally horizontal path to said chopping means.

23. Apparatus for determining the optical quality of a sheet of transparent or reflective material as claimed in claim 22, including an enclosed horizontally extending tunnel through which said incident beams travel from said light source to said first mirror and said beams projected from said sheet travel to said chopping means.

24. Apparatus for determining the optical quality of a sheet of transparent or reflective material as claimed in claim 23, including a plurality of mirrors positioned to receive said beams of light reflected from said upper surface and said reflective coating and with said upper concave mirror direct said beams through said tunnel to said chopping means along an optical path substantially equal in length to the optical path of the beams transmitted through said sheet.

25. Apparatus for determining the optical quality of a sheet of transparent or reflective material as claimed in claim 24, wherein one of said plurality of mirrors is adjustable to vary the length of said first named optical path.

26. Apparatus for determining the optical quality of a sheet of transparent or reflective material as claimed in claim 25, wherein said means directing said beams of light against said sheet includes a low power laser and a beam splitter and mirror dividing the laser light beam into said substantially parallel beams of light, said chopping means including a drum mounted for rotation at constant angular velocity about its longitudinal axis and an opening in the wall of said drum through which said beams of light pass, said light sensitive means being mounted within said drum so as to intercept the chopped beams of light passing through said opening, said signal processing means including, in sequence, a pre-amplifier, an amplifier, a differentiator, a Schmitt trigger, a signal gate, a digital-to-analog converter and a filter, and a strip recorder for receiving and recording the processed signal whereby the amplitude of the recorded signal represents type and magnitude of said imperfections and the longitudinal axis thereof represents position along said strip across said sheet.

27. Apparatus for determining the optical quality of a sheet of transparent or reflective material as claimed in claim 9, including means for adjusting the spacing between said incident beams of light, and a beam spacing calibrator adapted to be inserted in said apparatus in said position for inspection in place of said sheet, said calibrator including a stage mounted for linear movement, a micrometer for moving and accurately positioning said stage, a pair of photocells mounted upon said stage, and a meter connected to said photocells for indicating when said photocells are equally illuminated by one of said incident beams.

* * * * *